(12) United States Patent
Poulad

(10) Patent No.: US 12,276,959 B2
(45) Date of Patent: Apr. 15, 2025

(54) ADDITIVELY MANUFACTURED METAL FRAME

(71) Applicant: Microsoft Technology Licensing, LLC, Redmond, WA (US)

(72) Inventor: Navid Poulad, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 916 days.

(21) Appl. No.: 17/229,702

(22) Filed: Apr. 13, 2021

(65) Prior Publication Data
US 2022/0326535 A1    Oct. 13, 2022

(51) Int. Cl.
| | | |
|---|---|---|
| *G05B 19/18* | (2006.01) | |
| *B22F 10/28* | (2021.01) | |
| *B22F 10/66* | (2021.01) | |
| *B33Y 10/00* | (2015.01) | |
| *B33Y 40/20* | (2020.01) | |
| *B33Y 80/00* | (2015.01) | |
| *G02B 27/01* | (2006.01) | |
| *G02C 5/00* | (2006.01) | |

(52) U.S. Cl.
CPC ............ *G05B 19/186* (2013.01); *B22F 10/28* (2021.01); *B22F 10/66* (2021.01); *B33Y 10/00* (2014.12); *B33Y 40/20* (2020.01); *B33Y 80/00* (2014.12); *B22F 2301/052* (2013.01); *B22F 2301/205* (2013.01); *G02B 27/0176* (2013.01); *G02B 2027/0178* (2013.01); *G02C 5/008* (2013.01); *G05B 2219/37355* (2013.01)

(58) Field of Classification Search
None
See application file for complete search history.

(56) References Cited

U.S. PATENT DOCUMENTS

| | | | |
|---|---|---|---|
| 2017/0248802 A1* | 8/2017 | Rasschaert | G02C 5/146 |
| 2020/0101252 A1* | 4/2020 | Oddo | A61M 16/0672 |

FOREIGN PATENT DOCUMENTS

| | | | |
|---|---|---|---|
| BR | 102018011186 | * | 12/2019 |
| CN | 208880459 | * | 5/2019 |
| CN | 111805436 | * | 10/2020 |
| EP | 3639974 | * | 4/2020 |
| JP | 2003342654 | * | 12/2003 |
| KR | 20190039801 | * | 4/2019 |
| KR | 20190039801 A | | 4/2019 |

OTHER PUBLICATIONS

Machine Translation of CN111805436 (Year: 2020).*
Machine Translation of CN208880459 (Year: 2019).*

(Continued)

*Primary Examiner* — Shawn Mckinnon
(74) *Attorney, Agent, or Firm* — Alleman Hall & Tuttle LLP

(57) ABSTRACT

A method of manufacturing is provided, including forming a metal frame of a head-mounted computing device shaped as a pair of eyeglasses. Forming the metal frame may include additively manufacturing the metal frame of the head-mounted computing device by performing laser sintering on aluminum powder or titanium powder. Forming the metal frame may further include removing an outer surface of the metal frame via a reductive process.

19 Claims, 8 Drawing Sheets

(56) References Cited

OTHER PUBLICATIONS

Machine Translation of KR20190039801 (Year: 2019).*
Machine Translation of BR102018011186 (Year: 2019).*
Machine Translation of JP2003342654 (Year: 2003).*
"International Search Report & Written Opinion issued in PCT Application No. PCT/US22/021241", Mailed Date: Aug. 29, 2022, 15 Pages.
"Invitation to Pay Additional Fee Issued in PCT Application No. PCT/US22/021241", Mailed Date: Jul. 8, 2022, 8 Pages.

* cited by examiner

ADDITIVELY MANUFACTURED METAL FRAME

BACKGROUND

In augmented reality (AR) and virtual reality (VR) environments, content is presented to the user via a display located in close proximity to the user's eyes. This display is typically provided in a head-mounted computing device, which may take the form of goggles, glasses, or a visor. In AR configurations, content items are displayed at apparent locations in the user's physical environment while the user looks through a display surface that is at least partially transparent. In VR configurations, the content items are presented on an opaque display surface.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

According to one aspect of the present disclosure, a method of manufacturing is provided, including forming a metal frame of a head-mounted computing device shaped as a pair of eyeglasses. Forming the metal frame may include additively manufacturing the metal frame of the head-mounted computing device by performing laser sintering on aluminum powder or titanium powder. Forming the metal frame may further include removing an outer surface of the metal frame via a reductive process.

DETAILED DESCRIPTION

Some recent efforts in the development of head-mounted computing devices have focused on allowing users to comfortably wear head-mounted computing devices in a wide variety of settings, potentially for long periods of time. When a head-mounted computing device is heavy, the head-mounted computing device may be uncomfortable for users to wear for extended periods of time. Head-mounted computing devices with glasses form factors have recently been developed in order to reduce the weight of the head-mounted computing devices and make them more comfortable for wearers.

In addition, lack of rigidity may be a problem when a head-mounted computing device is used in an augmented reality configuration. When a head-mounted display device bends, the locations and orientations of the sensors and displays included in the head-mounted display device may change relative to each other and to the user's eyes. Accordingly, bending may produce distortions in the apparent locations of content items overlaid on the user's physical environment.

Low thermal conductivity may additionally present challenges for users of a head-mounted computing device. When the head-mounted computing device has low thermal conductivity, heat produced during operation of device components (e.g. a processor) may build up in some regions of the head-mounted computing device. This buildup of heat may make the head-mounted computing device uncomfortable to wear and may negatively affect the performance of the device components.

Figure 1:
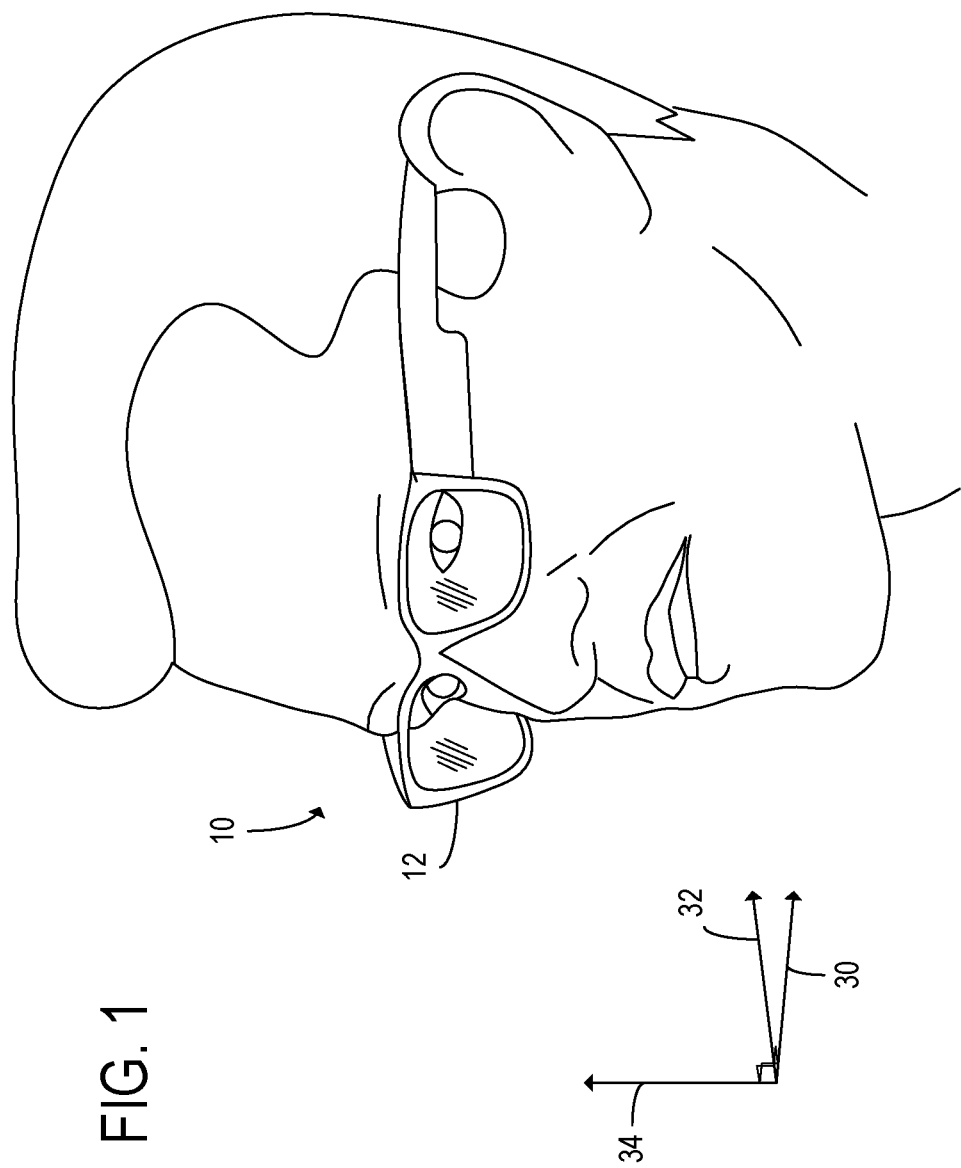
FIG. 1 shows a head-mounted computing device worn by a user, according to one example embodiment.

In order to address the above challenges, a head-mounted computing device is provided. FIG. 1 shows an example head-mounted computing device 10 worn by a user. The head-mounted computing device 10 may be in the form of a pair of eyeglasses. The example head-mounted computing device 10 of FIG. 1 includes a metal frame 12 in which other components of the head-mounted computing device 10 may be mounted, as discussed in further detail below. FIG. 1 further shows a leftward direction 30, a rearward direction 32, and an upward direction 34 that define a coordinate system. The leftward direction 30 is the direction toward the left side of the wearer's head, the rearward direction 32 is the direction toward the back of the wearer's head, and the upward direction 34 is the direction toward the top of the wearer's head when the head-mounted computing device 10 is worn.

The metal frame 12 of the head-mounted computing device may be formed at least in part from aluminum. Additionally or alternatively, the metal frame 12 may be formed at least in part from titanium. Aluminum and titanium have high stiffness and high yield strength. In addition, aluminum has low density and high thermal conductivity. However, there are some challenges associated with using conventional aluminum-part and titanium-part manufacturing techniques to manufacture lightweight frames for head-mounted computing devices. Conventional aluminum-part and titanium-part manufacturing techniques may be unable to achieve sufficiently low wall thicknesses to achieve device weights that are comfortable for wearers. Machining a thin-walled metal frame for a head-mounted computing device from an aluminum or titanium billet or even a near net-shape extrusion may be difficult, costly, and time-consuming. In addition, tool flight path constraints (constraints on positions that may be reached by a manufacturing device) may prevent manufacturing of the frames with certain shapes.

The methods of manufacturing discussed below may address the difficulties that may arise when manufacturing an aluminum or titanium frame. As used herein the terms "aluminum" and "titanium" include aluminum alloys and titanium alloys, unless described specifically as only pure aluminum or pure titanium. As an example, the aluminum alloy $AlSi_{10}Mg$ or the titanium alloy $Ti_6Al_4V$ may be used.

Figure 2:
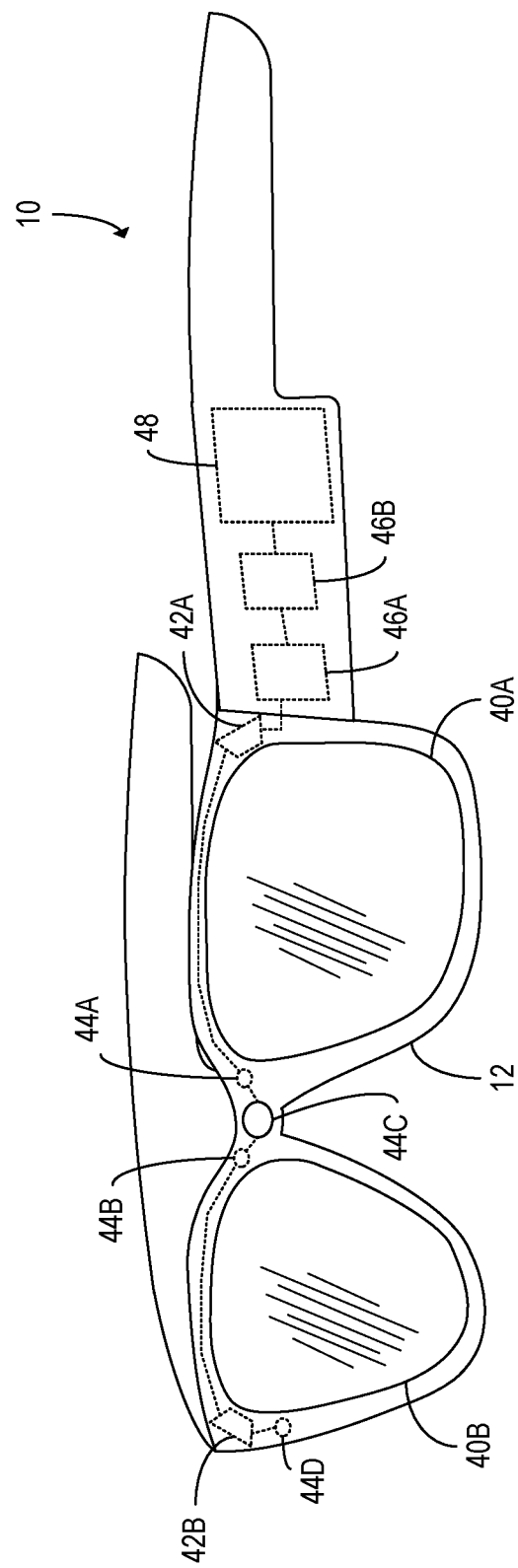
FIG. 2 shows the head-mounted computing device including components mounted in a metal frame, according to the example of FIG. 1.

FIG. 2 shows the example head-mounted computing device 10 of FIG. 1 including components that are mounted in the metal frame 12. In the example of FIG. 2, a left polycarbonate panel 40A and a right polycarbonate panel 40B are mounted within the rims of the metal frame 12. In addition, a left display 42A and a right display 42B are mounted within the rims. The left display 42A and the right display 42B may, for example, be configured to project images into the user's eyes. The example head-mounted computing device 10 of FIG. 2 further includes a first inward-facing optical sensor 44A and a second inward-facing optical sensor 44B configured to image the eyes of the user. The example head-mounted computing device 10 further includes an outward-facing optical sensor 44C configured to image the physical environment in which the user is situated and an accelerometer 44D configured to detect motion of the head-mounted computing device 10. The example head-mounted computing device 10 further includes a processor 46A, a memory device 46B, and a power source 48. The left display 42A, the right display 42B, the first inward-facing optical sensor 44A, the second inward-facing optical sensor 44B, the outward-facing optical sensor 44C, the accelerometer 44D, and processor 46A, and the memory device 46B are coupled to the power source 48 by a plurality of electrical traces. In addition, the left display 42A, the right display 42B, the first inward-facing optical sensor 44A, the second inward-facing optical sensor 44B, the outward-facing optical sensor 44C, and the accelerometer 44D are electrically coupled to the processor 46A and the memory device 46B in order to transmit data to, and receive data from, the processor 46A and the memory device 46B.

Figure 3:
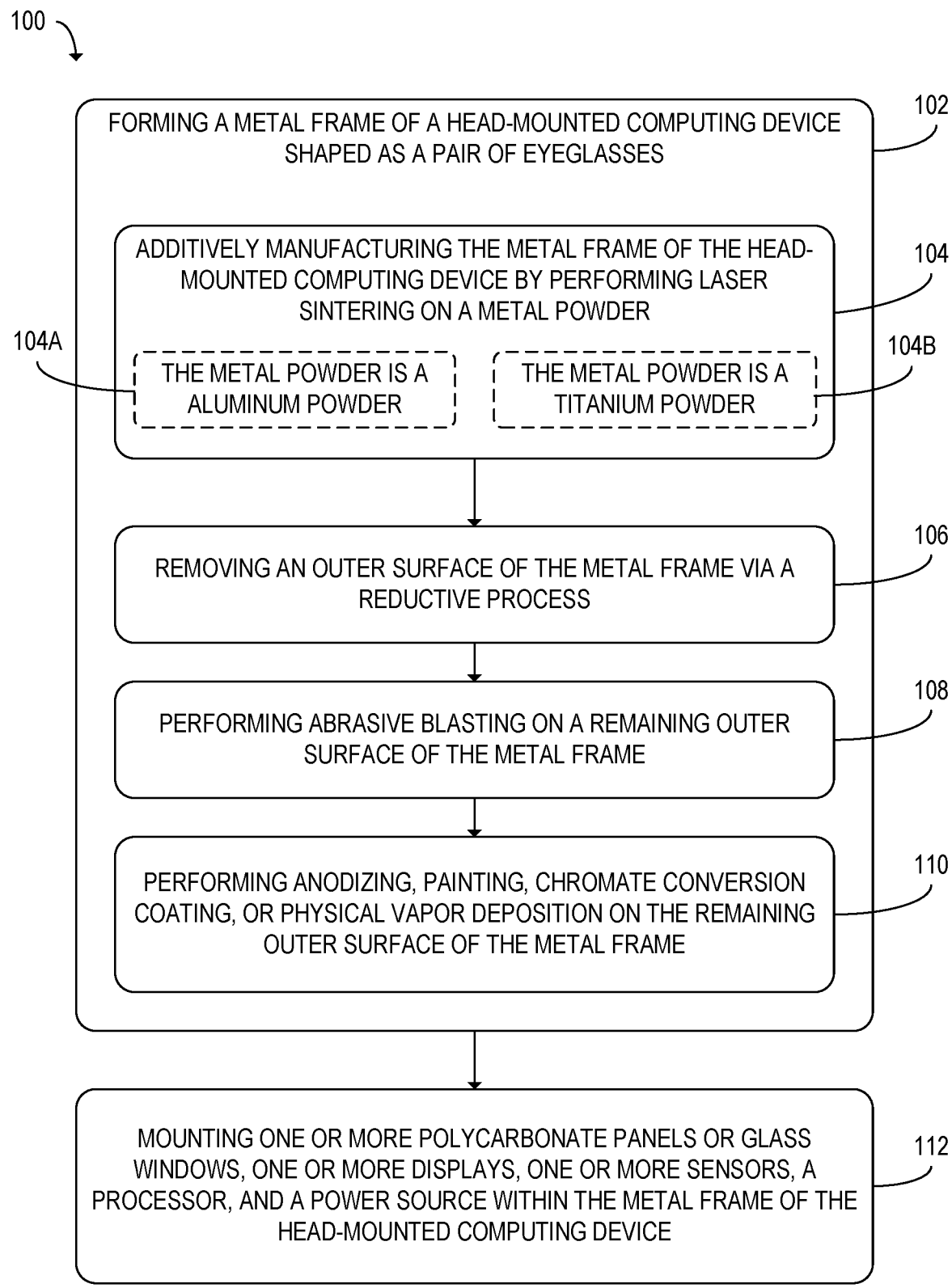
FIG. 3 shows a flowchart of a method of manufacturing a head-mounted computing device, according to the example of FIG. 1.

A method 100 of manufacturing a head-mounted computing device is provided, as shown in the example flowchart of FIG. 3. The method 100 of FIG. 3 may be used to manufacture the head-mounted computing device 10 shown in FIG. 1. At step 102, the method 100 may include forming a metal frame of a head-mounted computing device shaped as a pair of eyeglasses. Forming the metal frame may include, at step 104, additively manufacturing the metal frame of the head-mounted computing device by performing laser sintering on a metal powder. The metal powder may, for example, be aluminum powder, as shown at step 104A. By using additive manufacturing to form the metal frame, tool flight path constraints on the shape of the frame that would occur when using conventional aluminum-part manufacturing techniques may be avoided. In addition, the amount of time spent manufacturing the metal frame 12 may be reduced by using additive manufacturing, further reducing costs.

In some examples, the metal frame may be at least partially formed from some other metal that has a high strength-to-density ratio, such as titanium. When the metal frame is formed from titanium, forming the metal frame at step 102 may include, at step 104B, additively manufacturing the metal frame of the head-mounted computing device by performing laser sintering on titanium powder. Further, in other configurations, another metal powder that forms a finished part with suitable weight, rigidity, heat transfer and strength-to-density ratio characteristics may be used instead of or in addition to titanium and aluminum as described above.

When the metal frame is manufactured via laser sintering, the metal frame may have a porosity between 0.1% and 2%. With a porosity within this range, the metal frame may have sufficiently high thermal conductivity to allow the head-mounted computing device to remain at temperatures that are comfortable for the user and that allow device components to operate efficiently in typical use conditions. In addition, a porosity in the above range may give the metal frame sufficient rigidity to avoid noticeable deformation during typical use and may allow cosmetic defects in the metal frame 12 to be avoided or reduced below an acceptable threshold.

Manufacturing the metal frame via laser sintering of aluminum or titanium may result in the metal frame having a rough surface that may be cosmetically undesirable. In addition, a rough surface may corrode quickly, accumulate dirt easily, and be difficult to clean. In order to reduce surface roughness, forming the metal frame of the head-mounted computing device may further include, at step 106, removing an outer surface of the metal frame via a reductive process to achieve a final net shape of the metal frame. The reductive process may be a mechanical reductive machining process. In such examples, the mechanical reductive machining process may be computer numerical control (CNC) milling. Alternatively, the mechanical reductive machining process may be CNC machine polishing. In other examples, the reductive process may be a non-mechanical reductive process such as a chemical etching, plasma etching, or laser ablating process. In some examples, the outer surface removed via the reductive process may have a thickness between 0.2 mm and 0.5 mm. The metal frame may have a wall thickness between 0.15 mm and 0.75 mm after the outer surface is removed. After the reductive process has been performed to remove the outer surface, the remaining outer surface may have reduced surface roughness compared to the original outer surface and may be ready for application of an industrial-design cosmetic finish.

In some examples, at step 108, forming the metal frame may further include performing abrasive blasting on a remaining outer surface of the metal frame subsequently to performing the reductive process. In examples in which step 108 is performed, the remaining outer surface is the surface of the metal frame that is left after the reductive process is performed. The abrasive blasting process performed on the remaining outer surface may, for example, be a bead blasting process or a sandblasting process. Via the abrasive blasting process, the remaining outer surface may have a controlled and uniform fine texture.

In some examples, at step 110, forming the metal frame may further include anodizing the remaining outer surface of the metal frame subsequently to performing the reductive process. The remaining outer surface may be anodized after performing the abrasive blasting process. Anodizing the remaining outer surface may colorize the remaining outer surface and make the remaining outer surface more resistant to corrosion. Additionally or alternatively to anodizing the remaining outer surface, painting, chromate conversion coating, or physical vapor deposition may be performed on the remaining outer surface.

At step 112, the method 100 may further include mounting one or more polycarbonate panels or glass windows, one or more displays, one or more sensors, a processor, and a power source within the metal frame of the head-mounted computing device. The one or more displays may, for example, be microelectromechanical systems (MEMS) projectors. The power source may be a battery. The one or more sensors mounted in the metal frame may, for example, include one or more inward-facing optical sensors configured to image the user's eyes, and may further include one or more outward-facing optical sensors configured to image the physical environment in which the user is located. The one or more inward-facing optical sensors and the one or more outward-facing optical sensor may each include one or more component sensors, such as an RGB camera or a depth camera. The one or more sensors may additionally or alternatively include one or more position sensors. For example, the one or more position sensors may include one or more accelerometers, gyroscopes, magnetometers, global positioning systems, or multilateration trackers. In some examples, one or more additional components such as one or more memory devices, one or more wireless communication devices, one or more speakers, or one or more haptic feedback devices may also be mounted in the metal frame.

With each component included, the head-mounted computing device may have a total weight between 75 g and 120 g. A head-mounted computing device within this weight range may be sufficiently lightweight to not cause discomfort for the user.

Figure 4:
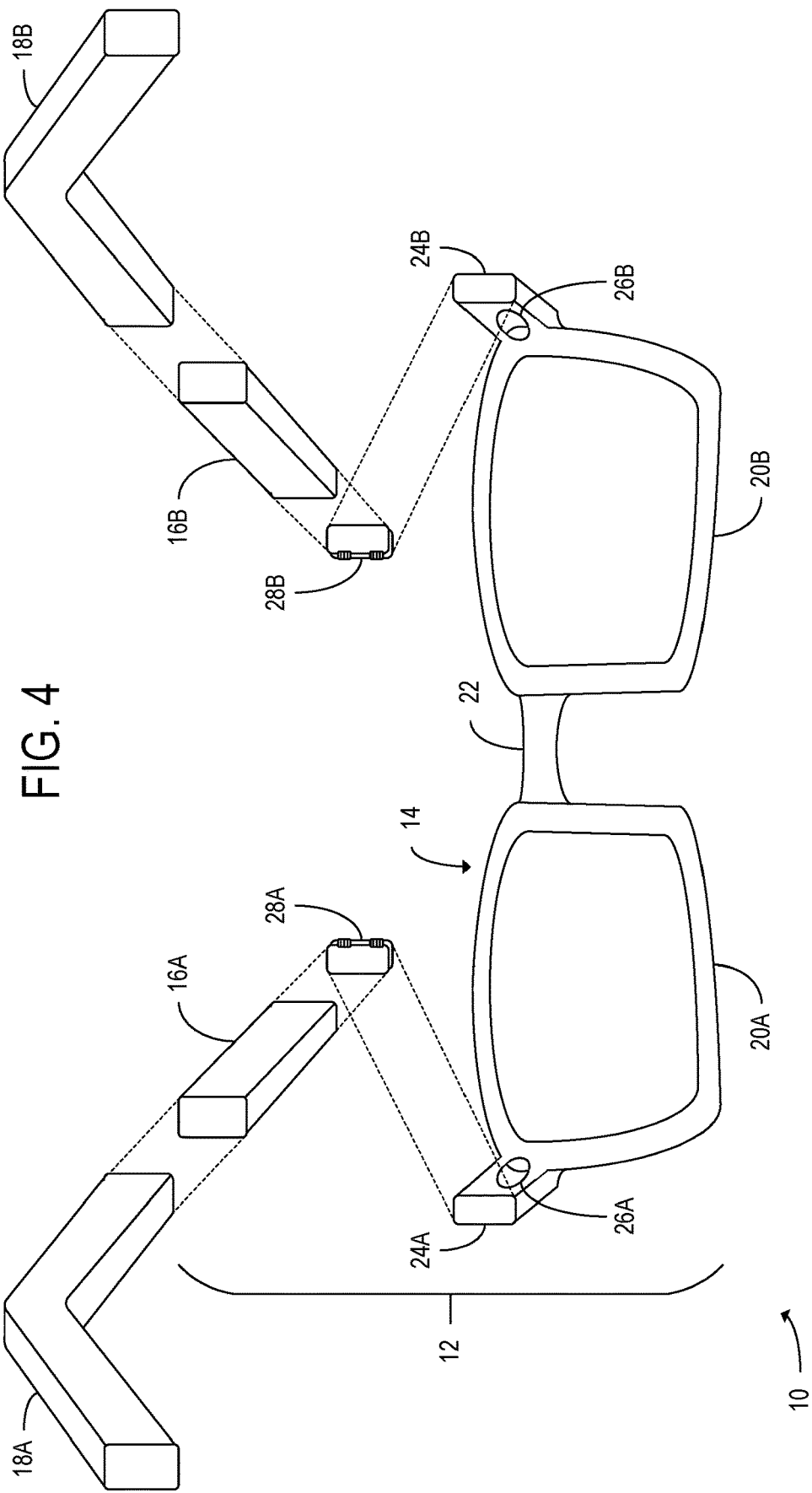
FIG. 4 shows an exploded view of the metal frame of the head-mounted computing device, according to the example of FIG. 1.

FIG. 4 shows an exploded view of the metal frame 12 of the head-mounted computing device 10, according to one example. A pair of temple tips 18A and 18B configured to be attached to the metal frame 12 is also shown in FIG. 4. In the example of FIG. 4, the metal frame 12 includes a first integral frame section 14 including a pair of rims 20A and 20B connected by a bridge 22. The pair of rims are formed as a left rim 20A and a right rim 20B. In addition, the rims 20A and 20B may each have an associated end piece 24A or 24B located opposite the bridge 22. The pair of end pieces may include a left end piece 24A and a right end piece 24B that are formed integrally with the left rim 20A and the right rim 20B, respectively. The end pieces 24A and 24B of the rims 20A and 20B may be hollow and may extend in the rearward direction 32 from the rims 20A and 20B. In addition, the end pieces 24A and 24B may each have a respective through-hole (shown in FIG. 4 as a left through-hole 26A and a right through-hole 26B) located on a side of the end piece 24A or 24B facing the corresponding rim 20A or 20B on which the end piece 24A or 24B is located.

The metal frame 12 may further include a pair of temple sections 16A and 16B. The temple sections 16A and 16B may be attached to the end pieces 24A and 24B of the first integral frame section 14. For example, the temple sections 16A and 16B may be attached to the end pieces 24A and 24B by a left hinge 28A and a right hinge 28B, respectively. In the example of FIG. 4, the left hinge 28A and the right hinge 28B are configured such that the end temple sections 16A and 16B may fold inward toward the first integral frame section 14.

As shown in the example of FIG. 4, the head-mounted computing device 10 may further include a respective temple tip 18A or 18B attached to a corresponding distal end of each of the pair of temple sections 16A and 16B, where the distal end of a temple section 16A or 16B is the end of that temple section 16A or 16B located opposite the corresponding rim 20A or 20B to which that temple section 16A or 16B is affixed. In some examples, each of the temple tips 18A and 18B may be at least partially formed from a polymer. Other materials such as metals or glass may additionally or alternatively included in the temple tips 18A and 18B.

Figure 5:
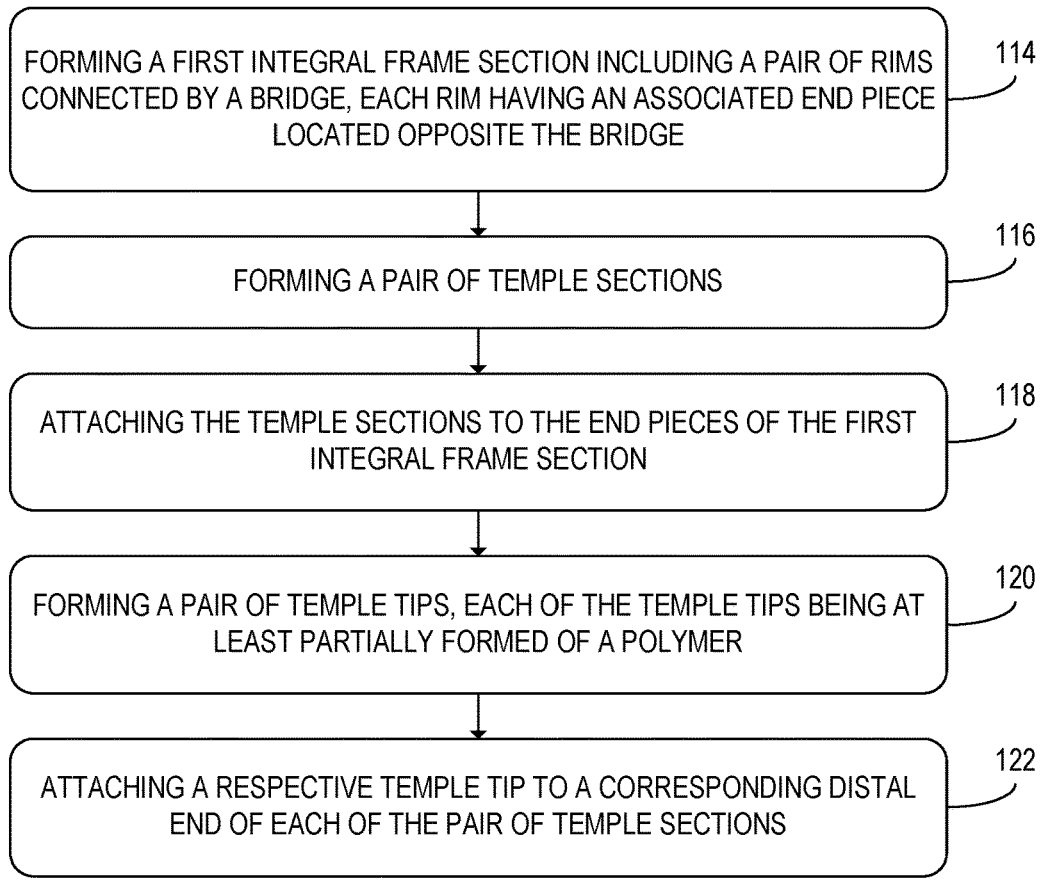
FIG. 5 shows additional steps of the method of FIG. 3 that may be performed when the metal frame includes a plurality of separately manufactured components.

FIG. 5 shows additional steps of the method 100 that may be performed when the metal frame includes a plurality of separately manufactured components, as in the example of FIG. 4. At step 114, forming the metal frame at step 102 may include forming a first integral frame section including a pair of rims connected by a bridge. Each rim may have an associated end piece located opposite the bridge. At step 116, step 102 may further include forming a pair of temple sections. The temple sections may be formed as separate components from the first integral frame section.

At step 118, step 102 may further include attaching the temple sections to the end pieces of the first integral frame section. Thus, the metal frame may be assembled from the separately manufactured components. In some examples, rather than being directly attached to the end pieces, the temple sections may be attached to the end pieces via respective hinges.

At step 120, the method 100 may further include forming a pair of temple tips. Each of the temple tips may be at least partially formed of a polymer. At step 122, the method 100 may further include attaching a respective temple tip to a corresponding distal end of each of the pair of temple sections. The head-mounted computing device may accordingly be assembled from the metal frame, the temple tips, and the components that may be mounted in the head-mounted computing device at step 112.

Figure 6:
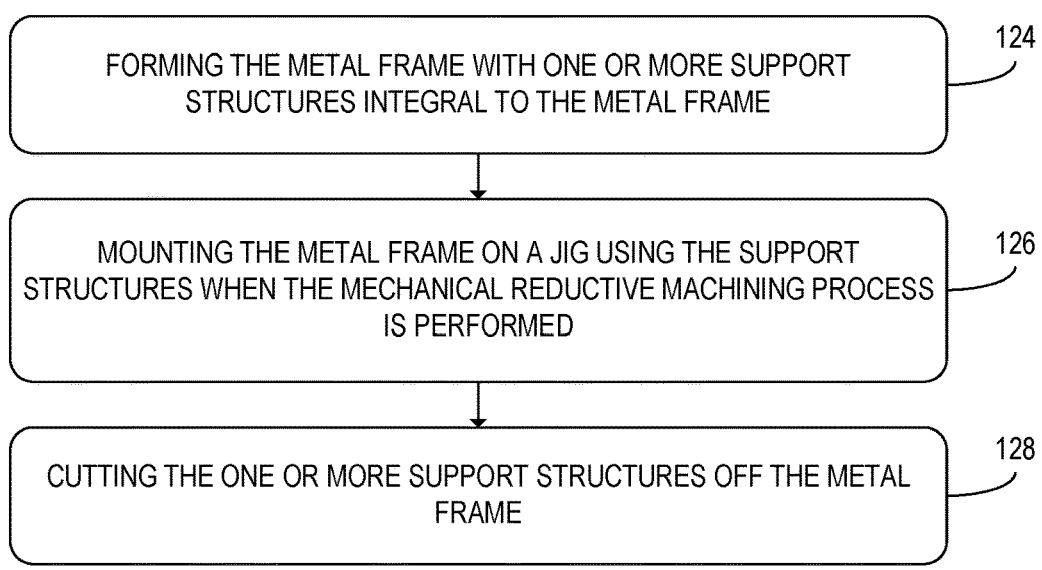
FIG. 6 shows additional steps of the method of FIG. 3 that may be performed when forming the metal frame.

In some examples, forming the metal frame at step 102 may further include the steps of FIG. 6. The steps shown in FIG. 6 may be performed in examples in which the reductive process is a mechanical reductive machining process. At step 124, step 102 may further include forming the metal frame with one or more support structures integral with the metal frame. The one or more support structures may be formed via laser sintering of a metal powder during step 104. For example, the one or more support structures may be formed by performing laser sintering on aluminum powder or titanium powder during step 104A or step 104B. At step 126, step 102 may further include mounting the metal frame on a jig using the support structures when the mechanical reductive machining process is performed. The one or more support structures may be affixed to the jig such that the metal frame is held in place during the mechanical reductive machining process is performed. Mounting the metal frame on the jig using the one or more support structures may allow a CNC machine to perform the mechanical reductive machining process of the outer surface of the metal frame without the jig covering areas of the outer surface other than surfaces of the one or more support structures. The one or more support structures may also distribute heat during the formation of the metal frame via laser sintering. Accordingly, the one or more support structures may be configured with a sufficiently high thermal conductivity and thermal mass as to reduce warpage of the metal frame, thus enabling the metal frame to be manufactured with greater dimensional accuracy.

At step 128, step 102 may further include cutting the one or more support structures off the metal frame. In some examples, additional mechanical reductive machining may be performed on the one or more surfaces of the metal frame at which the one or more support structures are cut off.

Figure 7:
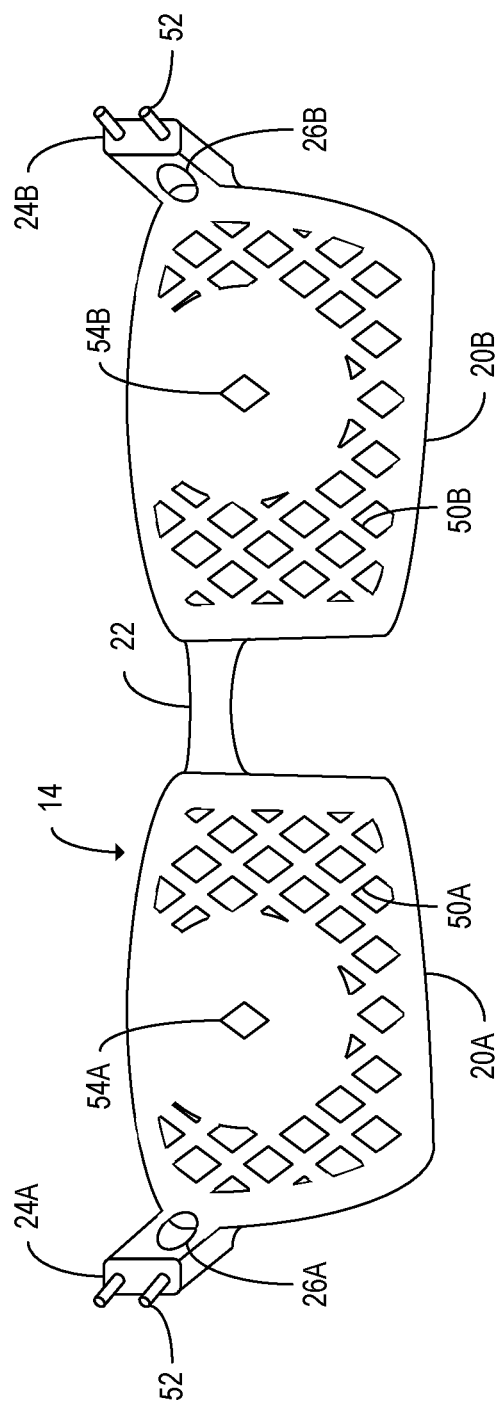
FIG. 7 shows an example of a first integral frame section of the metal frame according to the example of FIG. 1, which includes a plurality of support structures, which provide physical support and also thermal load balancing during manufacture.

FIG. 7 shows an example metal frame 12 formed with one or more support structures integral with the metal frame 12. In the example of FIG. 7, the one or more support structures include a left support lattice 50A and a right support lattice 50B located within the left rim 20A and the right rim 20B, respectively. In addition, the one or more support structures shown in the example of FIG. 6 include a plurality of hairline support structures 52. In the example of FIG. 6, the left support lattice 50A has a left central hole 54A and the right support lattice 50B has a right central hole 54B.

Figure 8:
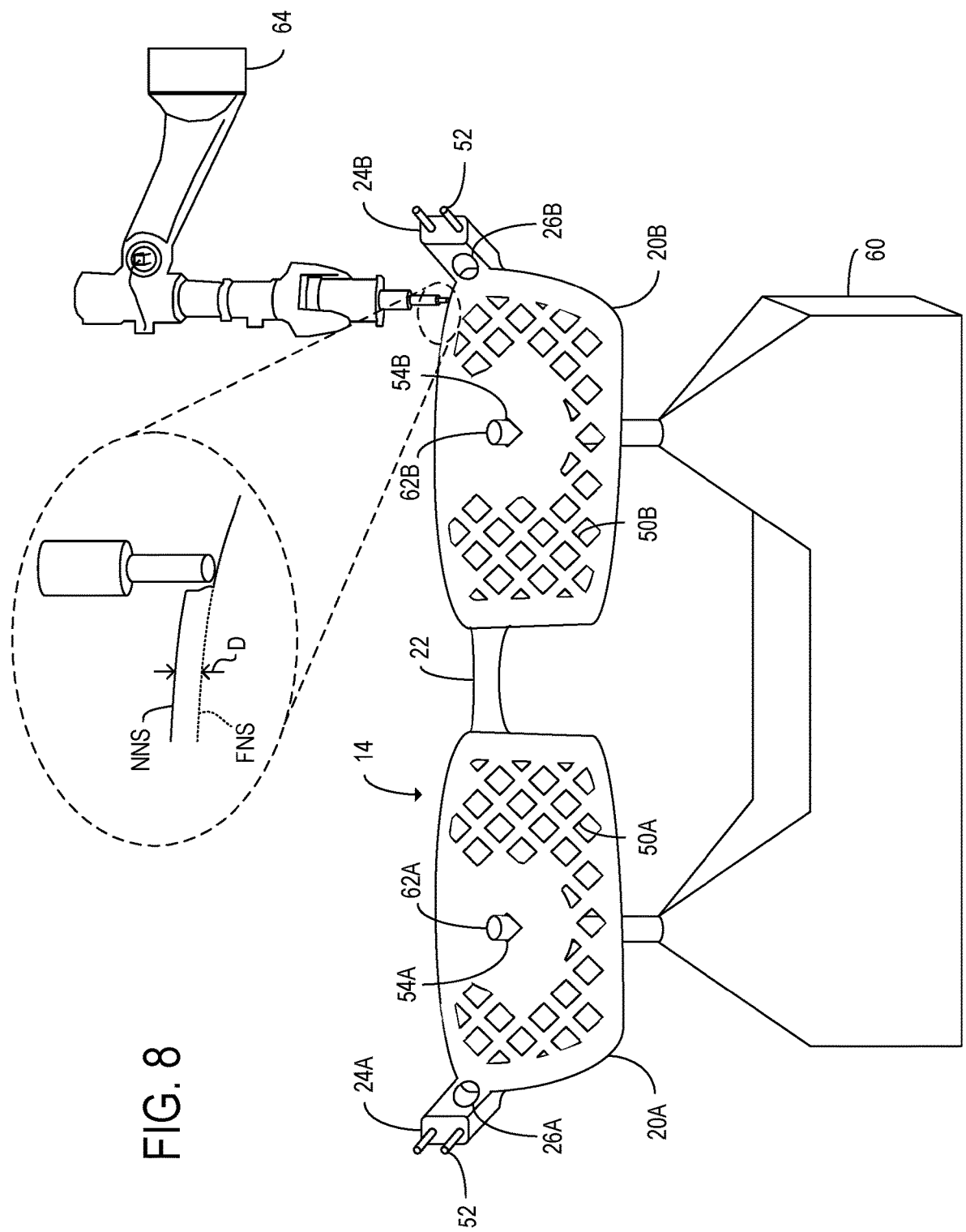
FIG. 8 shows the example first integral frame section of FIG. 7 when the first integral frame section is mounted on a jig using the support structures.

FIG. 8 shows the first integral frame section 14 of the metal frame 12 when the metal frame 12 is mounted on a jig 60, according to one example. When the first integral frame section 14 is mounted on the jig 60, the first integral frame section 14 may be held in place by a left prong 62A and a right prong 62B of the jig 60 that are inserted through the left central hole 54A and the right central hole 54B, respectively. While the first integral frame section 14 is held in place on the jig 60, a mechanical reductive machining process may be performed on the first integral frame section 14 using a CNC milling tool 64. In other examples, the mechanical reductive machining process may be performed at least in part with a CNC machine polishing tool.

In the example of FIG. 8, the outer surface with a thickness D is removed using the CNC milling tool 64. The removal of the outer surface may change a near net shape NNS of the metal frame 12 to a final net shape FNS. Although a near net shape is shown, it will also be appreciated that a shape that is larger than a near net shape may also be produced, from which material may be removed to produce the final net shape FNS. The outer surface removed via the mechanical reductive machining process may, for example, have a thickness between 0.2 mm and 0.5 mm. After the outer surface of the first integral frame section 14 has been removed via the mechanical reductive machining process, the first integral frame section 14 may have a wall thickness between 0.15 mm and 0.75 mm.

Using the methods discussed above, a head-mounted computing device with an eyeglasses form factor may be manufactured such that the metal frame of the head-mounted computing device has low weight, high rigidity, and high thermal conductivity. Accordingly, the head-mounted computing device discussed above allows the problems of device-weight-related discomfort, distortion of displayed images, and heat buildup to be more easily avoided. The cost of manufacturing the head-mounted computing device may also be reduced using the methods discussed above. In addition, the methods discussed above may result in the remaining outer surface of the metal frame having low roughness, which may make the remaining outer surface more cosmetically attractive and more resistant to corrosion and dirt accumulation. Thus, the head-mounted computing device may be more comfortable for the wearer and more practical to use in a wide variety of contexts.

Figure 9:
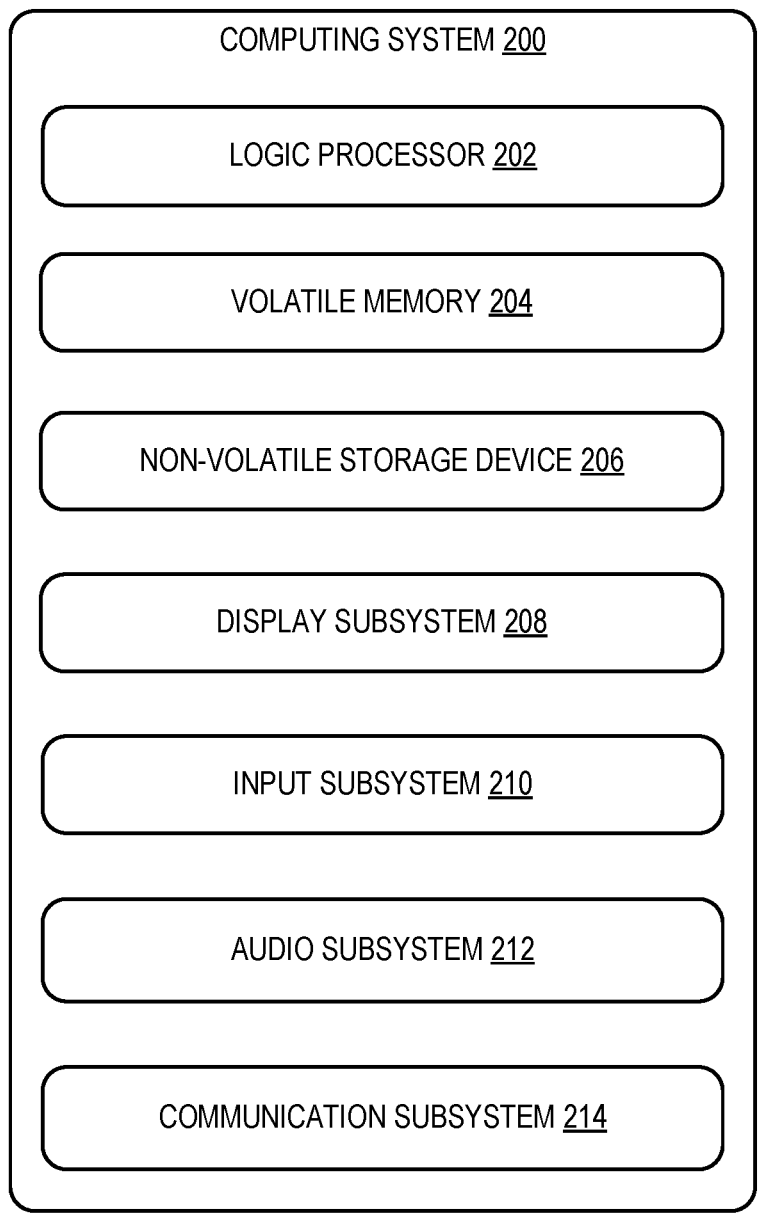
FIG. 9 shows a schematic view of an example computing environment in which the head-mounted computing device of FIG. 1 may be included.

FIG. 9 schematically shows a non-limiting embodiment of a computing system 200 that can enact one or more of the methods and processes described above. Computing system 200 is shown in simplified form. Computing system 200 may embody the head-mounted computing device 10 described above and illustrated in FIG. 1. In some examples, some components of the computing system 200 may be included in one or more other computing devices with which the head-mounted computing device 10 is configured to communicate.

Computing system 200 includes a logic processor 202 volatile memory 204, and a non-volatile storage device 206. Computing system 200 may further include a display subsystem 208, input subsystem 210, audio subsystem 212, communication subsystem 214, and/or other components not shown in FIG. 9.

Logic processor 202 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 202 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 206 includes one or more physical devices configured to hold instructions executable by the logic processors to implement the methods and processes described herein. When such methods and processes are implemented, the state of non-volatile storage device 206 may be transformed—e.g., to hold different data.

Non-volatile storage device 206 may include physical devices that are removable and/or built-in. Non-volatile storage device 206 may include optical memory, semiconductor memory, and/or magnetic memory, or other mass storage device technology. Non-volatile storage device 206 may include nonvolatile, dynamic, static, read/write, read-only, sequential-access, location-addressable, file-addressable, and/or content-addressable devices. It will be appreciated that non-volatile storage device 206 is configured to hold instructions even when power is cut to the non-volatile storage device 206.

Volatile memory 204 may include physical devices that include random access memory. Volatile memory 204 is typically utilized by logic processor 202 to temporarily store information during processing of software instructions. It will be appreciated that volatile memory 204 typically does not continue to store instructions when power is cut to the volatile memory 204.

Aspects of logic processor 202, volatile memory 204, and non-volatile storage device 206 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 200 typically implemented in software by a processor to perform a particular function using portions of volatile memory, which function involves transformative processing that specially configures the processor to perform the function. Thus, a module, program, or engine may be instantiated via logic processor 202 executing instructions held by non-volatile storage device 206, using portions of volatile memory 204. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

The display subsystem 208 may be used to present a visual representation of data held by non-volatile storage device 206. The visual representation may take the form of a graphical user interface (GUI). As the herein described methods and processes change the data held by the non-volatile storage device, and thus transform the state of the non-volatile storage device, the state of display subsystem 208 may likewise be transformed to visually represent changes in the underlying data. Display subsystem 208 may include one or more display devices. Such display devices may be combined with logic processor 202, volatile memory 204, and/or non-volatile storage device 206 in a shared enclosure, or such display devices may be peripheral display devices.

When included, input subsystem 210 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, audio subsystem 212 may include one or more speakers configured to emit audio output. Audio subsystem 214 may additionally or alternatively include one or more microphones configured to receive audio input. In some examples, the one or more microphones may be included in the NUI componentry of the input subsystem 210.

When included, communication subsystem 214 may be configured to communicatively couple various computing devices described herein with each other, and with other devices. Communication subsystem 214 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 200 to send and/or receive messages to and/or from other devices via a network such as the Internet.

The following paragraphs discuss several aspects of the present disclosure. According to one aspect of the present disclosure, a method of manufacturing is provided, including forming a metal frame of a head-mounted computing device shaped as a pair of eyeglasses. Forming the metal frame may include additively manufacturing the metal frame of the head-mounted computing device by performing laser sintering on aluminum powder or titanium powder. Forming the metal frame may further include removing an outer surface of the metal frame via a reductive process.

According to this aspect, the reductive process is a mechanical reductive machining process. The mechanical reductive machining process may be computer numerical control (CNC) milling or machine polishing.

According to this aspect, when the metal frame is additively manufactured via laser sintering, the metal frame may be formed with one or more support structures integral with the metal frame. Forming the metal frame may further include mounting the metal frame on a jig using the support structures when the mechanical reductive machining process is performed. Forming the metal frame may further include cutting the one or more support structures off the metal frame.

According to this aspect, forming the metal frame may further include performing abrasive blasting on a remaining outer surface of the metal frame subsequently to performing the reductive process.

According to this aspect, forming the metal frame may further include performing anodizing, painting, chromate conversion coating, or physical vapor deposition on the remaining outer surface of the metal frame subsequently to performing the reductive process.

According to this aspect, the metal frame may have a wall thickness between 0.15 mm and 0.75 mm after the outer surface is removed.

According to this aspect, the outer surface removed via the reductive process may have a thickness between 0.2 mm and 0.5 mm.

According to this aspect, the metal frame may have a porosity between 0.1% and 2%.

According to this aspect, the head-mounted computing device may have a weight between 75 g and 120 g.

According to this aspect, the metal frame may include a plurality of separately manufactured components, including a first integral frame section including a pair of rims connected by a bridge. Each rim may have an associated end piece located opposite the bridge. The plurality of separately manufactured components may further include a pair of temple sections. The temple sections may be attachable to the end pieces of the first integral frame section.

According to this aspect, the method may further include attaching a respective temple tip to a corresponding distal end of each of the pair of temple sections. Each of the temple tips may be at least partially a polymer.

According to this aspect, the end pieces of the rims may be hollow and may extend in a rearward direction from the rims. The end pieces may each have a respective through-hole located on a side of the end piece facing the corresponding rim on which the end piece is located.

According to this aspect, the method may further include mounting one or more polycarbonate panels or glass windows, one or more displays, one or more sensors, a processor, and a power source within the metal frame of the head-mounted computing device.

According to this aspect, the metal frame may be formed to define external surfaces of the head mounted computing device.

According to another aspect of the present disclosure, a head-mounted computing device is provided, including a metal frame shaped as an eyeglasses frame. The metal frame may be aluminum or titanium with a porosity between 0.1% and 2%. The metal frame may have a wall thickness between 0.15 mm and 0.75 mm. The head-mounted computing device may further include one or more polycarbonate panels or glass windows, one or more displays, one or more sensors, a processor, and a power source mounted within the metal frame of the head-mounted computing device. The head-mounted computing device may have a weight between 75 g and 120 g.

According to this aspect, the metal frame may include a plurality of separable components, including a first integral frame section including a pair of rims connected by a bridge. Each rim may have an associated end piece located opposite the bridge. The metal frame may further include a pair of temple sections. The temple sections may be attached to the end pieces of the first integral frame section.

According to this aspect, the head-mounted computing device may further include a respective temple tip attached to a corresponding distal end of each of the pair of temple sections. Each of the temple tips may be at least partially a polymer.

According to this aspect, the end pieces of the rims may be hollow and may extend in a rearward direction from the rims. The end pieces may each have a respective through-hole located on a side of the end piece facing the corresponding rim on which the end piece is located.

According to this aspect, the metal frame may define external surfaces of the head-mounted computing device.

According to another aspect of the present disclosure, a method of manufacturing is provided, including forming a metal frame of a head-mounted computing device shaped as a pair of eyeglasses. Forming the metal frame may include additively manufacturing the metal frame of the head-mounted computing device by performing laser sintering on aluminum powder or titanium powder. Forming the metal frame may further include removing an outer surface of the metal frame via a mechanical reductive machining process. Forming the metal frame may further include performing abrasive blasting on a remaining outer surface of the metal frame. Forming the metal frame may further include performing anodizing, painting, chromate conversion coating, or physical vapor deposition on the remaining outer surface of the metal frame. The method may further include mounting one or more polycarbonate panels or glass windows, one or more displays, one or more sensors, a processor, and a power source within the metal frame of the head-mounted computing device.

"And/or" as used herein is defined as the inclusive or $\lor$, as specified by the following truth table:

| A | B | A $\lor$ B |
|---|---|---|
| True | True | True |
| True | False | True |
| False | True | True |
| False | False | False |

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method of manufacturing, comprising:
   forming a metal frame of a head-mounted computing device shaped as a pair of eyeglasses, at least in part by:
   additively manufacturing the metal frame of the head-mounted computing device by performing laser sintering on aluminum powder or titanium powder, wherein:
   the metal frame is formed with one or more support structures integral with the metal frame; and
   the one or more support structures include one or more lattice support structures and/or one or more hairline support structures;
   mounting the metal frame on a jig using the support structures;
   cutting the one or more support structures off the metal frame; and
   removing an outer surface of the metal frame via a reductive process.

2. The method of claim 1, wherein:
   the reductive process is a mechanical reductive machining process; and
   the mechanical reductive machining process is computer numerical control (CNC) milling or machine polishing.

3. The method of claim 1, wherein forming the metal frame further includes performing abrasive blasting on a remaining outer surface of the metal frame subsequently to performing the reductive process.

4. The method of claim 1, wherein forming the metal frame further includes performing anodizing, painting, chromate conversion coating, or physical vapor deposition on the remaining outer surface of the metal frame subsequently to performing the reductive process.

5. The method of claim 1, wherein the metal frame has a wall thickness between 0.15 mm and 0.75 mm after the outer surface is removed.

6. The method of claim 1, wherein the outer surface removed via the reductive process has a thickness between 0.2 mm and 0.5 mm.

7. The method of claim 1, wherein the metal frame has a porosity between 0.1% and 2%.

8. The method of claim 1, wherein the head-mounted computing device has a weight between 75 g and 120 g.

9. The method of claim 1, wherein the metal frame includes a plurality of separately manufactured components, including:
   a first integral frame section including a pair of rims connected by a bridge, each rim having an associated end piece located opposite the bridge; and
   a pair of temple sections, wherein the temple sections are attachable to the end pieces of the first integral frame section.

10. The method of claim 9, further comprising:
    attaching a respective temple tip to a corresponding distal end of each of the pair of temple sections, each of the temple tips being at least partially a polymer.

11. The method of claim 9, wherein:
    the end pieces of the rims are hollow and extend in a rearward direction from the rims; and
    the end pieces each have a respective through-hole located on a side of the end piece facing the corresponding rim on which the end piece is located.

12. The method of claim 1, further comprising mounting one or more polycarbonate panels or glass windows, one or more displays, one or more sensors, a processor, and a power source within the metal frame of the head-mounted computing device.

13. The method of claim 1, wherein the metal frame is formed to define external surfaces of the head mounted computing device.

14. A head-mounted computing device comprising:
a metal frame shaped as an eyeglasses frame, wherein:
the metal frame is aluminum or titanium with a porosity between 0.1% and 2%; and
the metal frame has a wall thickness between 0.15 mm and 0.75 mm; and
one or more polycarbonate panels or glass windows, one or more displays, one or more sensors, a processor, and a power source mounted within the metal frame of the head-mounted computing device,
wherein the head-mounted computing device has a weight between 75 g and 120 g.

15. The head-mounted computing device of claim 14, wherein the metal frame includes a plurality of separable components, including:
a first integral frame section including a pair of rims connected by a bridge, each rim having an associated end piece located opposite the bridge; and
a pair of temple sections, wherein the temple sections are attached to the end pieces of the first integral frame section.

16. The head-mounted computing device of claim 15, further comprising a respective temple tip attached to a corresponding distal end of each of the pair of temple sections, each of the temple tips being at least partially a polymer.

17. The head-mounted computing device of claim 15, wherein:
the end pieces of the rims are hollow and extend in a rearward direction from the rims; and
the end pieces each have a respective through-hole located on a side of the end piece facing the corresponding rim on which the end piece is located.

18. The head-mounted computing device of claim 14, wherein the metal frame defines external surfaces of the head-mounted computing device.

19. A method of manufacturing, comprising:
forming a metal frame of a head-mounted computing device shaped as a pair of eyeglasses, at least in part by:
additively manufacturing the metal frame of the head-mounted computing device by performing laser sintering on aluminum powder or titanium powder, wherein:
the metal frame is formed with one or more support structures integral with the metal frame; and
the one or more support structures include one or more lattice support structures and/or one or more hairline support structures;
mounting the metal frame on a jig using the support structures;
cutting the one or more support structures off the metal frame;
removing an outer surface of the metal frame via a mechanical reductive machining process;
performing abrasive blasting on a remaining outer surface of the metal frame; and
performing anodizing, painting, chromate conversion coating, or physical vapor deposition on the remaining outer surface of the metal frame; and
mounting one or more polycarbonate panels or glass windows, one or more displays, one or more sensors, a processor, and a power source within the metal frame of the head-mounted computing device.

* * * * *